Figure 21:
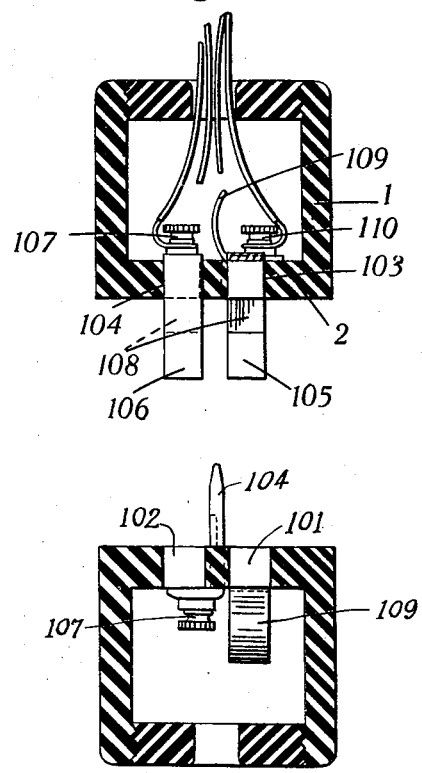

Nov. 5, 1940. H. BRIGHT 2,220,810
MECHANICAL AND ELECTRICAL COUPLING
Filed Jan. 11, 1937 3 Sheets-Sheet 1
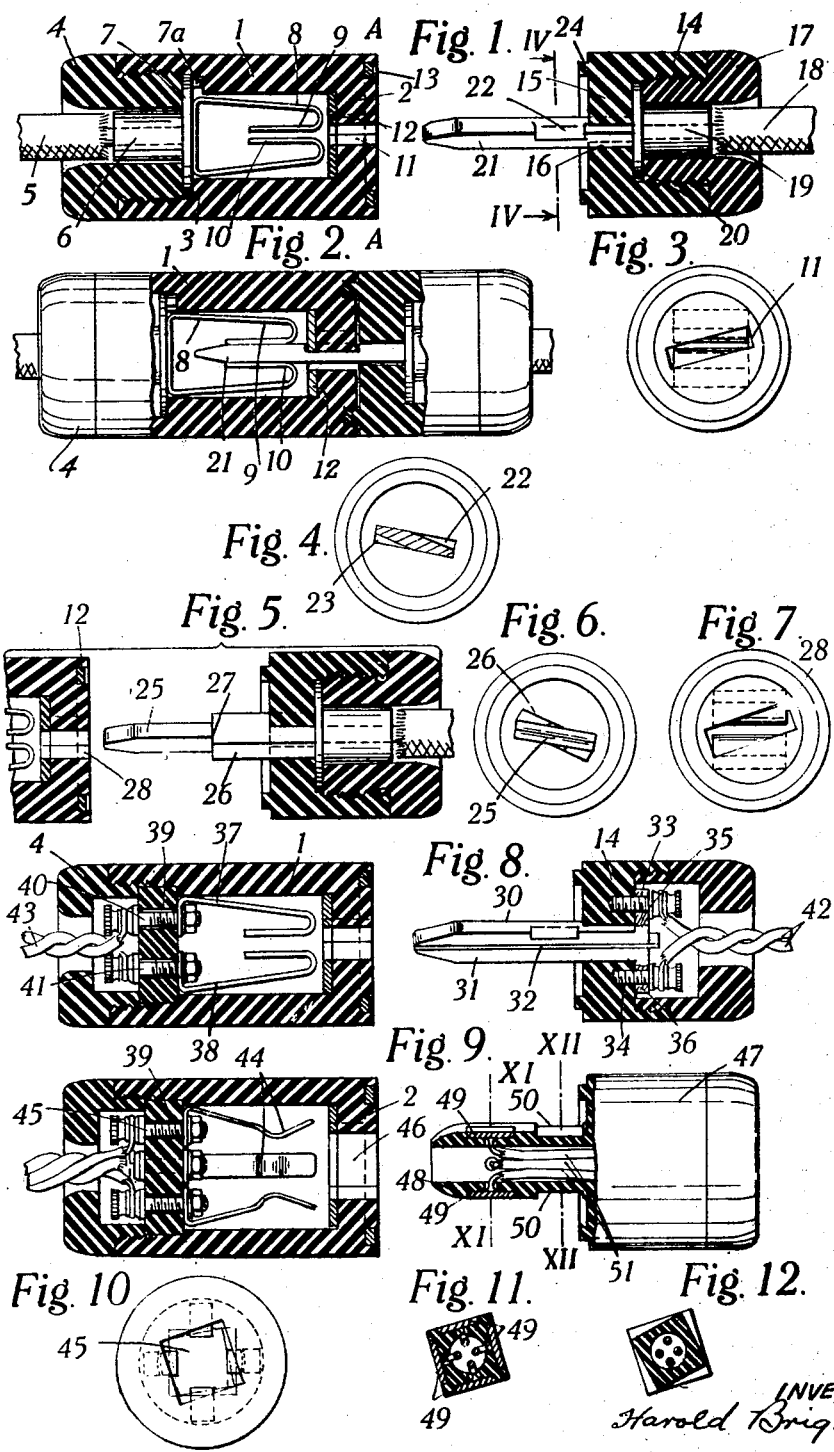

Nov. 5, 1940.    H. BRIGHT    2,220,810
MECHANICAL AND ELECTRICAL COUPLING
Filed Jan. 11, 1937    3 Sheets-Sheet 2
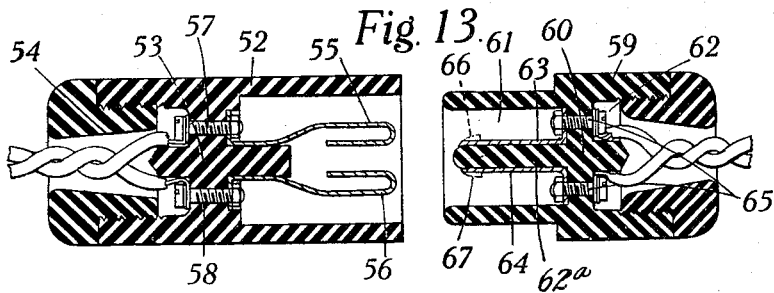
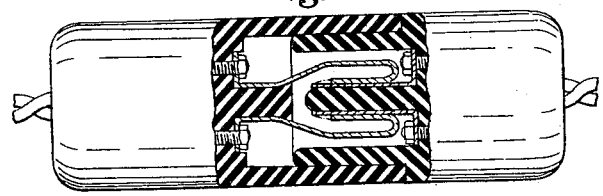
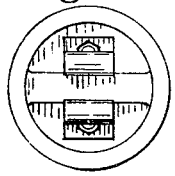
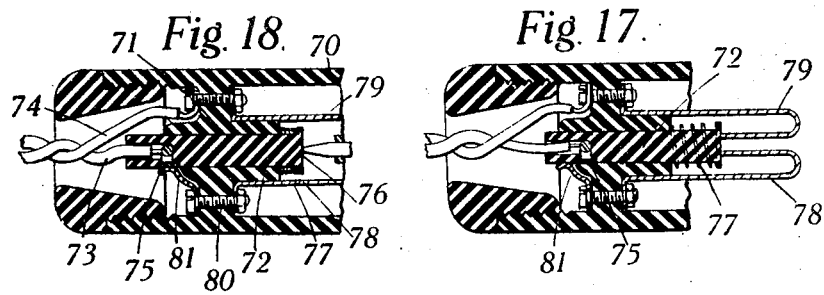
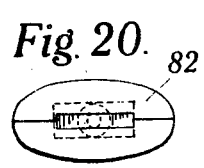
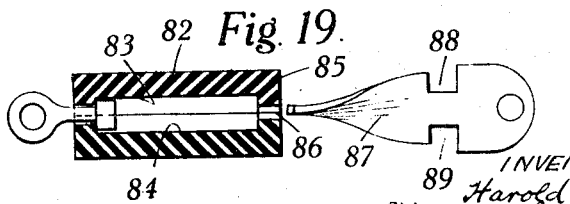
INVENTOR
Harold Bright
BY Stone, Boyden & Mack,
ATTORNEYS Patented Nov. 5, 1940

2,220,810

UNITED STATES PATENT OFFICE 2,220,810

MECHANICAL AND ELECTRICAL COUPLING

Harold Bright, London, England

Application January 11, 1937, Serial No. 120,096
In Great Britain January 11, 1936

6 Claims. (Cl. 173—328)

This invention relates to improvements in or modifications of the couplings described and claimed in the specification of the copending application Serial No. 33,174, filed July 25, 1935, which matured to Patent 2,149,550 issued March 7, 1939.

The aforesaid copending application discloses a coupling for electrical or mechanical purposes comprising a socket containing a member adapted to press resiliently upon a flat side of a tongue to be inserted in the socket, and to urge the tongue to take up a position with said flat side in a predetermined plane, and a stop projecting from one edge of said flat side adapted to lock said tongue within said socket while the tongue is in the position referred to. The stop is disengaged by turning said tongue out of its normal position, against the action of said resiliently acting member.

It will be understood that the stop projecting from one edge of the flat side of the tongue adapted to lock the latter within the socket may be constituted either by a projection on the tongue or by the walls of a recess or notch formed in the said tongue.

In the form of construction of coupling shown in the aforesaid specification, the stops provided on the tongue are formed on the leading end thereof, and are adapted to engage behind the inner end or ends of one or more inwardly directed leaf members, resiliently urged against the tongue.

In one aspect of the present invention the aforesaid arrangement is modified by locating the stop or stops near the trailing end of the tongue, and the socket is provided with an outer end wall having a restricted aperture through which the tongue can pass, the resilient means provided in the socket turning the tongue after the stops thereon have passed through the restricted aperture so as to bring said stops into engagement with the inside of the end wall of the socket adjacent the edges of said aperture.

In order to accommodate the turning movement of the flat leading end of the tongue, the trailing end of the tongue may be formed with notches or recesses which the edges of the elongated slot may enter when the tongue turns into its normal position, so that the tongue is locked thereby against movement in the outward direction or in the inward and outward directions. Alternatively the trailing end of the tongue may be set obliquely to the leading end so that it rests in the obliquely set elongated slot when the leading end of the tongue has turned into its normal resting position.

An advantage of this construction lies in the fact that the stop or stops on the tongue engage a rigid portion of the socket member so that an outward pull is taken up by a rigid member instead of by the resilient member or members, for example, leaf springs, which lock the couplings when the stops are located at the leading end of the tongue.

In the form of socket according to this feature of the invention, electrical connection may more easily be made to the resilient members which contact with the tongue. This is due to the fact that the inner ends of the leaf springs constituting the resilient means in the socket need not be left free, because the tongue does not pass beyond the inner ends thereof as it does in the former types of coupling, and accordingly, the end of one of the leaf members may be extended inwardly, or bent back and a terminal provided on the extended or bent-back end.

In another aspect the present invention consists in a coupling comprising a socket having an end wall provided with a restricted aperture and containing resilient means, and an elongated member having a flattened surface adapted to be inserted through said restricted aperture into said socket so that its flattened surface is engaged by the resilient means which urge the elongated member to take up a position with the flattened surface in a predetermined plane. The said elongated member has near its trailing end stops with which the walls of the restricted aperture are adapted to engage to prevent withdrawal of the elongated member when its flattened surface lies in said predetermined plane. The said elongated member is withdrawn from said socket by twisting it slightly against the action of the resilient means to clear the walls of the restricted aperture from said stops.

In another aspect of the present invention there is provided a multi-pole electric coupling comprising a socket containing a plurality of contacts insulated from each other and in electric connection with one of the ends of the electric line to be connected together, said contacts being adapted to press resiliently upon corresponding insulated flat contacts in electric connection with the other end of the electric line to be connected and arranged on an elongated member to be inserted in said socket. The said resiliently acting contacts urge the elongated member to take up a predetermined angular position in which a stop or stops formed thereon lock the said member within the socket. The said stop or stops are disengaged by turning the said elongated member out of said predetermined angular position and against the action of the resiliently acting contacts.

Whether the stops are provided at the leading or trailing end of the tongue or elongated member, the flat contacts may be arranged around the periphery of a central stem of insulating material so as to provide a number of flat faces. Preferably the stops are constituted by projections or by recesses or notches formed in a pair of flat contacts on opposite faces of the elongated member but, if desired, all of the flat contacts may be provided with a stop, or the stops may be formed on the insulating stem.

The invention also extends to a two-pole electric coupling in which the socket contains a pair of contacts adapted to press resiliently upon opposite flat sides of a tongue to be inserted between them, the tongue comprising a pair of contacts strips separated by insulating material. The resiliently acting contacts urge the tongue to take up a position with each flat side in a predetermined plane, a stop formed on the one edge of one of the flat sides or stops formed on the edges of both of the flat sides of the tongue being adapted to lock the latter within the socket while the tongue is in the position referred to. The stop or stops are disengaged by turning the tongue out of its normal position and against the action of the resiliently acting contact.

Means may be provided in the half of the coupling comprising the socket for ejecting or facilitating the withdrawal of the tongue. For this purpose, the socket may house a plunger against one end of which the leading end of the tongue or elongated member bears when inserted in the socket, the said tongue or elongated member moving the plunger against the action of a spring. With this arrangement, when the tongue or elongated member is twisted to unlock it from the socket, the plunger tends to eject it from the socket.

In the case of a coupling for electrical purposes, the plunger may be arranged to operate a switch or make-and-break device adapted to place the resilient means in connection with the respective end of the electric line after the tongue has made contact with said resilient means.

In another aspect the present invention consists in an electrical lamp, thermionic valve, or like electric fitting having an elongated member provided with a flat contact and with a stop located at its trailing end, said elongated member being adapted to be inserted in a socket having an end wall provided with a restricted aperture and containing a spring contact in such a manner that the flat contact is engaged by the spring contact and the elongated member urged to take up a position with the flat contact in a predetermined plane. In this position the walls of the restricted aperture of the socket are adapted to engage the stop on the elongated member and prevent withdrawal of the latter. The said elongated member may be withdrawn from the socket when it is twisted slightly against the action of the spring contact to clear the walls of the restricted aperture from the stop.

In still a further aspect of the invention a coupling for electrical or mechanical purposes comprises a socket with an end wall provided with a restricted aperture and a tongue of spring material adapted to be inserted therein, said tongue having stops at its trailing end, said socket and said tongue cooperating during insertion so that the leading end of the tongue is twisted relatively to the trailing end until the stops have entered the restricted aperture, whereupon the said trailing end turns under the spring action of the tongue and the stops lock the said tongue within the socket.

The principle of the coupling described and claimed in the copending application Serial No. 33,174 may be applied to an hermaphrodite coupling. To this end the two parts to be connected together each contain socket means and a tongue, or an equal number of socket means and tongues.

In order that the invention may be clearly understood and readily carried into effect the same will now be described more fully with reference to the accompanying drawings in which:

Figure 1 is a section illustrating one form of coupling in accordance with the invention the two parts being in the disengaged position.

Figure 22:
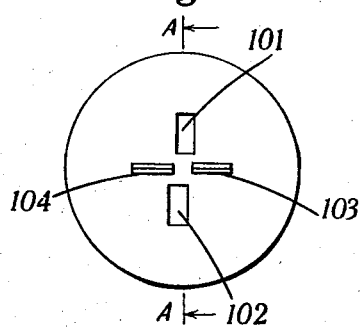
Figure 23:
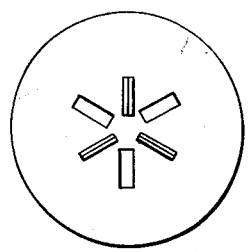

Figure 2 is a sectional elevation of the form of coupling shown in Figure 1, the parts being in the engaged position, Figure 3 is an end view of the socket comprising one half of the coupling shown in Figure 1, Figure 4 is a cross-section on the line IV—IV Figure 1, Figure 5 is a fragmentary view in section illustrating another form of coupling, Figure 6 is an end view of the part of the coupling shown in Figure 5, provided with the tongue, Figure 7 is an end view of the socket of the coupling shown in Figure 5, Figures 8 and 9 illustrate other forms of coupling in accordance with the invention, Figure 10 is an end view of the socket of the coupling shown in Figure 9, Figures 11 and 12 are cross-sections on the lines XI—XI and XII—XII respectively of Figure 9, Figure 13 is a longitudinal section illustrating another form of coupling in accordance with the invention, the parts being in the disengaged position, Figure 14 is a sectional elevation of the form of coupling shown in Figure 13, the parts being in the engaged position, Figure 15 is an end view of the socket of the coupling shown in Figures 13 and 14, Figure 16 is an end view of the other half of the said coupling, Figure 17 is a fragmentary view in longitudinal section of another form of socket for a coupling in accordance with the invention before insertion of the tongue and, Figure 18 is a view similar to Figure 17 showing the position of the parts after insertion of the tongue in the socket, Figures 19 and 20 are respectively a section and an end view of a further form of coupling, Figures 21 and 22 are respectively a section and an end view of a further form of coupling, the lower half of Fig. 21 being taken on the line A—A of Fig. 22, and Figure 23 is an end view of a coupling differing slightly from that of Figure 22.

Referring to the form of the invention shown in Figures 1 to 4, the socket of the coupling comprises a hollow cylinder 1 of insulating material closed at one end by a wall 2. The internal diameter at the other end of the cylinder is enlarged providing an internal shoulder 3 and the wall at this end is internally screw threaded to receive a plug 4. The plug 4 is provided with a central opening to receive one end of an electric lead 5, the said end being one of the two ends of the electric line to be connected together. Within the cylinder 1 is mounted a terminal member 6 having a flange 7 clamped between the shoulder 3 and the plug 4, the lead 5 being connected to the rear end of the said terminal member. At its other end the said terminal member carries a resilient contact comprising a flat metal strip 8 bent into the shape of a U with the ends 9 and 10 of the limbs of the U bent inwardly back upon themselves. The end wall 2 of the socket is provided with a slot 11 set obliquely to the substantially parallel planes in which the flat inturned ends 9 and 10 of the contact strip 8 lie, as shown in Figure 3. The internal face of the end wall 2 is provided with a metallic lining 12 having a slot which registers with the slot 11. The outer face of the end wall is provided with an annular recess to receive packing material 13.

The other part of the coupling comprises a hollow cylindrical member 14 of insulating material having an end wall 15 formed with a slot 16. The interior of the hollow cylindrical member is screw-threaded throughout the greater part of its length to receive a plug 17 having a central aperture to receive the end 18 of the electric line. The said end of the electric line is connected to a terminal member 19, comprising a flange 20 and a tongue 21, arranged within with cylindrical member 14 with the tongue 21 extending through the slot 16 and the flange 20 clamped between the inner face of the wall 15 and the plug 17. As shown in Fig. 4 one edge of the upper side of the tongue 21 is provided with a recess or notch 22 positioned adjacent the end wall 15 whilst the opposite edge of underside of the tongue is provided with a similarly positioned recess or notch 23. The external face of the end wall 15 is provided with an annular projection 24 corresponding with the annular packing 13 on the end wall 2.

The two parts of the coupling are connected together by inserting the tongue 21 through the slot 11 so that its leading end is inserted between the ends 9 and 10 of the contact strip 8. Due to the inclination of the slot 11 with respect to the planes in which the ends of the flat strip 8 lie and the consequent angular position of the tongue 21 when inserted, the limbs of the contact strip are forced apart and urge the tongue in the clockwise direction with reference to Figure 3. When the tongue has been inserted to the fullest possible extent, it is free to turn under the spring action of the contact strip 8, the edges of the end wall 2 adjacent the slot 11 entering the recesses 22 and 23. In this position the tongue 21 is locked within the socket. It will be seen that when the two parts of the coupling are in the coupled position the annular projection presses against the packing 13 thus rendering the arrangement water-tight.

To disengage the parts of the coupling it is merely necessary to twist the tongue slightly in the anti-clockwise direction with reference to Figure 3 against the action of the contact strip 8 so that the edges of the end wall 2 adjacent the slot 11 clear the edges of the recesses 22 and 23, whereupon the tongue can be withdrawn from the socket.

In the modification of the invention shown in Figures 5, 6 and 7, instead of the tongue being formed with recesses near its trailing end, two lateral cuts are formed on its opposite edges at a suitable distance along its length and its leading end 25 is twisted out of the plane of the remainder 26 of the tongue so as to form shoulders 27. In this construction a slot 28 is formed in the end wall of the socket, the said slot being similar to but somewhat broader than the slot 11 of Figures 1 to 3 to enable both the part 25 and the part 26 of the tongue to pass through it. In other respects the socket resembles that shown in Figures 1 to 3 and operates in a similar manner.

Figure 8 illustrates the present invention as applied to a two-pole electric coupling. In this form of the invention the tongue comprises two strips of brass or like metal 30 and 31 separated by a layer of insulating material 32. The said strips 31 and 32 are secured to the cylindrical member 14 by terminals 33, 34 which extend through lateral extensions 35, 36 at the rear ends of the said strips 31 and 32. The resilient means in the socket in this form of the invention comprises two flat contact strips 37 and 38 each separately connected to a disc member 39 of insulating material by means of terminal bolts 40, 41, the said disc member being clamped between the plug 4 and the cylindrical member 1. 42, 43 are the ends of the two-wire electric line to be connected together, the conductors of the end 42 being connected to the terminals 33, 34 and those of the end 43 being connected to the terminals 40, 41.

Figure 9 illustrates the application of the invention to a four-pole electric coupling. In this construction the socket is provided with four spring contact strips 44 each separately mounted on an insulating disc member 39, by terminal bolts 45, the arrangement being similar to the mounting of the spring contact strips described with reference to Figure 8. The end wall 2 of the socket is formed with a square opening 46 the sides of the square lying obliquely to the planes in which the corresponding flat contacts 44 lie. The other part of the coupling comprises a cylindrical member 47 of insulating material having a hollow stem 48 extending from its end wall around the periphery of which stem four flat contacts 49 are arranged. The trailing end of the stem, that is, the end adjacent the cylindrical member 47, is formed with a series of notches 50. Terminals (not shown) are provided within the cylindrical member 47 which are connected with the flat contacts 49 by insulated conductors 51. The two parts of the coupling are connected together and disconnected in a manner similar to the parts of the coupling shown in the preceding figures.

Figures 13 to 16 illustrate a form of coupling in which the stops are mounted on the leading end of the tongue. The socket comprises a hollow cylindrical member 52 having a partition 53. The rear end of the socket is internally screw-threaded to receive a plug 54 having a central opening through which the two conductors forming one end of the electric line enter the socket. The forward end of the socket houses a pair of flat spring contacts 55 and 56 mounted by means of terminal bolts 57 and 58 on the partition 53 transverse to the axis. The ends of the said contact strips 55 and 56 are turned inwards and backwards. The other part of the coupling comprises a hollow cylindrical member 59 divided by a transverse partition 60 into the forward hollow portion 61 and a rearward hollow portion 62. The wall of the latter portion is screw-threaded internally to receive a plug having a central opening through which the two conductors of the other end of the electric line are led to the coupling. The wall of the forward portion 61 is adapted to telescope within the cylindrical member 52 as shown in Figure 14. The hollow portion 61 is divided longitudinally by a partition 62a on opposite sides of which flat contact strips 63, 64 are arranged, the said contact strips being connected by terminals 65 to the transverse partition 60. The ends of the two conductors of the electric line to be connected are connected to the said terminals. At the leading end and at one edge of the contact strip 63 a projection 66 is provided whilst a similar projection 67 is provided on the opposite edge of the contact strip 64 as shown in Figure 16.

The parts of the coupling are connected together by inserting the leading end of the member 59 into the socket member 52 so that the partition 62a carrying the contact strips 63, 64 passes between the spring contacts 55 and 56. Due to location of the projections 66 and 67 on opposite edges of the contact strips 63, 64 the spring contacts 55, 56 are forced slightly apart and the strips lie at a slight angle thereto until the said projections have cleared the inner ends of said contacts. The spring contacts then act on opposite edges of the said contact strips 63, 64 and rotate them into parallel relation with the contacts, the whole member 59 being also rotated, and thereby locked within the member 52. In order to disconnect the parts it is merely necessary to rotate the member 59 relatively to the member 52 in such a direction that, as the spring contacts are moved apart, the projections 66 and 67 clear their inner ends. The two parts of the coupling may then be easily disconnected by a direct pull.

Figures 17 and 18 illustrate a construction in which the locking means hereinbefore described are combined with a switch. In this construction of coupling the socket comprises a cylindrical member 70 of insulating material provided with an internal support 71 carrying in a central bore a plunger 72 also of insulating material. 73 and 74 are the conductors of a twin cable. The plunger 72 carries at its rear end a flat contact 75 to which the conductor 73 is connected. The other end of the plunger is provided with a head 76 and a spring 77 is arranged between the said head and the support 71, which spring tends to maintain the plunger in its forward position as shown in Figure 17. 78, 79 are the spring contact strips of the coupling. The spring contact strip 77 is secured to the support 71 by one end of a terminal bolt 80 to the other end of which one end of a bent contact strip 81 is also attached. The other end of the contact strip 81 bears against the side of the plunger 72 near its rear end. In the forward position of the plunger shown in Figure 17 the contact 75 is out of engagement with the contact strip 81, the two contacts being brought into engagement when the plunger is moved into its rearmost position shown in Figure 18. The spring contact 79 is secured to the support 71 by means of a terminal bolt 80 to which the other conductor 74 of the twin cable is connected. The length of the plunger 72 and the position of its contact 75 are selected so that when the tongue or other elongated member on the male part of the coupling has been fully inserted into the socket the plunger is moved to its rearmost position so that the spring contact 78 is placed in electric connection with the conductor 73 through the flat contact 75, the bent contact 81 and the terminal bolt 80.

The switch mechanism described above is also applicable to a single-pole coupling. Moreover, the plunger may be arranged to operate any other suitable type of switch mechanism. For high power circuits, a quick-acting switch mechanism is preferable for example, switch mechanism having a toggle action.

The spring 77 may be strong enough to eject the tongue after it has been twisted to free it from the socket, thus effecting automatically the separation of the two halves of the coupling. This feature of spring-ejection may also be used when no switch is provided.

The tongue may be provided with two pairs of stops so that there are two positions of the tongue in which the halves of the coupling are locked together. When used with the switch mechanism hereabove referred to, the arrangement may be such that when the tongue is inserted only so far that the pair of stops nearer to the leading end effect the locking of the parts, the plunger 72 is not depressed, so that a mechanical but not electrical connection is effected, and when the tongue is inserted to its fullest extent so that the other pair of stops effect the locking, the plunger is depressed to establish the electric connection.

Figs. 19 and 20 illustrate a form of the invention in which the twisting action of the tongue to cause the stops to lock the tongue within the socket is effected by the tongue itself instead of by resilient means disposed within the said socket.

Referring to these figures, the socket 82 is formed with flat internal surfaces 83, 84 and its end wall 85 is provided with a slot 86. The tongue 87 consists of a flat spring strip which is twisted helically about its longitudinal axis. The trailing end of the tongue is formed with notches 88, 89. When the tongue is inserted in the socket the slot 86 causes it to turn with a corkscrew motion until its leading edges engage the internal surfaces 83, 84. Further movement of the tongue causes it to flatten out against its own spring action until the trailing end carrying the notches 88, 89 has entered the slot 86 whereupon the trailing end turns under its tendency to resume its initial set, the edges of the slot entering the notches.

Figures 21 and 22 show a four-pole hermaphrodite coupling in accordance with the invention. The end wall 2 of the socket 1 of one part of the coupling is provided with slots 101, 102, 103, 104 the arrangement thereof being approximately cruciform. Tongues 105, 106 extend through the slots 103, 104 and are secured to the inner side of the end wall 2 by terminal bolts 107 only one of which is shown. Each of the tongues is provided at its trailing end on one side with a recess 108 the said recesses facing in opposite directions and the deepest part of the recesses being at the outer edges of the tongues. Adjacent each of the slots 101, 102 and on opposite sides thereof is a leaf spring 109 only one of which is shown, the said leaf springs being secured to the end wall 2 by terminal bolts 110. The four conductors comprising one end of the line to be connected are connected to the terminal bolts of the tongues and leaf springs.

It being understood that the other part of the coupling is constructed in exactly the same manner as the part previously described, the two parts are locked together by inserting the tongues 105, 106 of one part in the slots 101, 102 of the other part, the pressure of the leaf springs 109 causing the two parts of the coupling to rotate relatively to one another when the tongues are fully inserted, the edges of the slots 101, 102 entering the recesses 102. The parts are disengaged by slightly twisting the two parts and then pulling the same apart as in the various forms of the invention previously described.

Instead of providing recesses at the trailing end of the tongues, the latter may be formed with lugs or projections at the leading ends adapted to engage behind the ends of the leaf springs when the two parts of the coupling are coupled together.

Figure 23 shows the arrangement of the sockets and tongues when the principle of the hermaphrodite coupling previously described is applied to a six-pole coupling. This principle may also be applied to other forms of coupling, for example, simple mechanical couplings and single or two-pole electric couplings.

I claim:

1. A coupling of the class described comprising a socket member, a wall at the entrance of said socket member having a slot, resilient means within said socket member having a flat surface slightly inclined with respect to said slot, a plug member having a flat tongue adapted to be inserted through said slot, said tongue having a notch at one edge and near its trailing end, whereby after said tongue has been fully inserted through said slot said plug member is twisted about its longitudinal axis under the action of said resilient means on said tongue so that the edge of said slot enters said notch, and whereby said tongue may be withdrawn by turning it slightly against the action of said resilient means to clear the edge of said slot from said notch.

2. A coupling of the class described comprising a socket member, a wall at the entrance of said socket member having a slot, resilient means within said socket member having a flat surface slightly inclined with respect to said slot, a plug member having a tongue of flat material adapted to be inserted through said slot, the leading end of said tongue being set obliquely to the trailing end so that the shoulders formed by the projection of the rear edges of the leading end beyond the surfaces of the trailing end form stops, whereby after said tongue has been fully inserted through said slot said plug member is twisted about its longitudinal axis under the action of said resilient means on said tongue so that the stops engage behind portions of the end wall adjacent the slot and whereby said tongue may be withdrawn after turning it slightly against the action of said resilient means to clear said stops from said end wall.

3. A coupling of the class described comprising a socket member, a resilient detent within said socket member, a plug member having a male member adapted to enter said socket member and rotatable therein about its longitudinal axis, said male member having a flat surface adapted to engage said detent, a stop on said flat surface spaced from one edge thereof, said stop cooperating with said edge to compress the resilient detent whilst the male member is being inserted in said socket member, said resilient detent twisting said male member when the same has been fully inserted to lock said stop behind said resilient detent, a spring-pressed plunger in said socket member adapted to be depressed by said tongue when the latter is fully inserted in said socket, whereby the male member may be withdrawn from said socket after twisting it about its longitudinal axis to clear said stop from said detent whereupon said spring-pressed plunger ejects the tongue from the socket.

4. A coupling of the class described comprising a socket member, guide means located at the entrance of said socket member, resilient means within said socket member, a plug member having a male member adapted to enter said socket member through said guide means, said male member having a flat surface, and a stop on said flat surface adjacent the trailing end of said male member, said stop being spaced from one edge thereof, said guide means being arranged to present said flat surface to said resilient means at such an angle that one edge of said surface compresses said resilient means until said stop has passed through said guide means, whereupon said resilient means rotates said male member and causes said stop to cooperate with said guide means to lock said male member within said socket member, whereby the male member may be withdrawn from said socket member after twisting it against the action of said resilient means to clear said stop from said guide means.

5. An electric coupling comprising a socket member, guide means located at the entrance of said socket member, flat spring contacts within said socket member, a plug member having a male member adapted to enter said socket member through said guide means, said male member including flat contact strips and insulating material separating said contact strips and at least one stop on said male member offset with respect to the longitudinal axis of one of said contact strips and near the trailing end of said male member, said guide means being arranged to present said male member to said flat spring contacts at such an angle that opposite edges of the flat contact strips on said male member compress said flat spring contacts until said stop has passed through said guide means, whereupon said flat spring contacts rotate said male member about its longitudinal axis and cause said stop to cooperate with said guide means to lock said male member within said socket member, whereby the male member may be withdrawn from said socket member after twisting it against the action of said flat spring contacts to clear said stop from said guide means.

6. An electric coupling comprising a socket member having a pair of spring contacts having inwardly directed ends, and a plug member having a male member carrying flat contacts insertable endwise into said socket member, so that said flat contacts pass between said spring contacts, said male member having a locking lug projecting transversely from at least one of said flat contacts, said lug being relatively low as compared with the width of said flat contact and being spaced a substantial distance from one longitudinal side of said flat contact, whereby a slight turning movement of the male member about its longitudinal axis through an angle substantially less than 90° serves to move said spring contacts apart and thus release said lug.

HAROLD BRIGHT.